United States Patent [19]

Born

[11] 4,156,811
[45] May 29, 1979

[54] METHOD AND APPARATUS FOR SEPARATING ISOTOPES FROM A GAS BY MEANS OF A LASER

[75] Inventor: Gunthard Born, Taufkirchen, Fed. Rep. of Germany

[73] Assignee: Messerschmitt-Bolkow-Blohm GmbH, Munich, Fed. Rep. of Germany

[21] Appl. No.: 794,060

[22] Filed: May 5, 1977

[30] Foreign Application Priority Data

May 14, 1976 [DE] Fed. Rep. of Germany ....... 2621345

[51] Int. Cl.² .................. B01D 59/44; H01J 27/00
[52] U.S. Cl. ................................. 250/284; 250/423 P
[58] Field of Search ............................ 250/423 P, 284

[56] References Cited

U.S. PATENT DOCUMENTS 4,025,790  5/1977  Jetter et al. ..................... 250/423 P Primary Examiner—Harold A. Dixon
Attorney, Agent, or Firm—W. G. Fasse; W. W. Roberts

[57] ABSTRACT

Isotopes are separated from a gas mixture by accelerating the gas mixture containing the isotopes to ultrasonic speeds sufficient to bring the gas temperature to 150° K or less. Simultaneously, the gas is subject to a pressure well above the vapor pressure of the gas at said temperature. Under these conditions the gas is subjected to a laser radiation having a wave length corresponding to the absorption line or band of the molecules containing the isotopes to be separated, whereby the molecules are excited so that they may be separated by conventional devices. The present apparatus has a high pressure reservoir supplying the gas mixture through a device for producing said ultrasonic speeds into an expansion chamber. As the gas flowing at said speeds is irradiated by the laser beam, it expands into a low pressure reservoir. The laser is arranged so that the laser beam extends across the expanding gas flow at a point where the expanding gas does not yet start to condense.

16 Claims, 2 Drawing Figures

METHOD AND APPARATUS FOR SEPARATING ISOTOPES FROM A GAS BY MEANS OF A LASER

BACKGROUND OF THE INVENTION

The present invention relates to a method and apparatus for separating isotopes by means of a laser.

Certain isotopes, for example those of uranium, which are distinguished from each other merely by their atomic weight, are not at all or hard to separate by known chemical or physical methods or means. Thus, it has been suggested in "Laser Focus", July 1975, page 12 to irradiate atomic uranium vapor by means of a dye laser tuned to the absorption band of a uranium isotope and to simultaneously irradiate the atomic uranium vapor by means of an ultra-violet light source, whereby a selective ionization of the absorbing isotope is accomplished so that the ionized isotope may be collected by means of a negatively charged collector. A drawback of this known method is the very small density of the uranium vapor that may be achieved, because such low density calls for a large plant volume. Another disadvantage is seen in the difficult and expensive handling of the uranium vapor, because the latter is very corrosive, especially since it must be produced at temperatures exceeding 2,000° K. Another drawback of the prior art method is seen in that the radiation of the tuned laser light must take place in the visible wave length range. This is considered to be a disadvantage because lasers presently available for operation in this wave length range have a low degree of efficiency. Besides, two light sources are required for this type of prior art operation. A further separation method has been described in "Laser Focus", July 1975, page 48. In this method a high power laser is used to irradiate the molecules which contain the isotopes to be separated in the vapor phase. The wave length of the high power laser is tuned to one absorption line of the type of molecule which contains a specific isotope. It is an advantage of this prior art method that it is easy to handle the molecule vapors, whereby the pressures are within respectively about the one Torr range. Further, is possible to use IR-lasers, which operate with a high degree of efficiency. However, the just described prior art method is suitable only for separating relatively light isotopes, such as sulphur and boron. This method is not suitable for heavy isotopes, such as uranium, because the isotope shift of the spectral lines of molecules containing heavy isotopes such as $UF_6$, is small. Another difficulty is seen in the fact that the spectra comprise a large number of spectral lines. Besides, the line width is substantial due to molecular impacts and due to a Doppler effect, whereby, for example, the spectral lines of $U^{235}F_6$ and of $U^{238}F_6$ molecules overlap each other. This fact prevents a selective excitation and dissociation of a particular species of molecules. In addition, the absorption of $UF_6$ in a wave length range wherein IR-high power lasers are available, is small, whereby again an efficient isotope separation is not possible. It would also be a disadvantage to lower the temperature for the purpose of reducing the width of the spectral lines for the purpose of increasing the spectral selectivity, because lowering the temperature entails a substantial reduction in the vapor pressure. As a result, the molecular density is also lowered, whereby the absorption coefficient also becomes lower. Besides, lowering the temperature would require again unefficiently large plant volumes.

OBJECTS OF THE INVENTION

In view of the above, it is the aim of the invention to achieve the following objects singly or in combination:

to provide a method and apparatus for the separation of isotopes which will avoid the above described drawbacks and disadvantages of the prior art;

to irradiate a gas mixture containing molecules with the isotopes to be separated, by a laser radiation of high intensity while exposing the gas mixture to certain operating conditions to be described below; and to suggest an apparatus wherein means are provided for the combination and/or selection of advantageous operating conditions, for example, with regard to the composition of the carrier gas and the selection of the gas pressures and so forth.

SUMMARY OF THE INVENTION

According to the invention there is provided a method for separating isotopes by means of a laser, wherein a gas mixture containing molecules with the isotopes to be separated, is accelerated to supersonic speeds to thereby bring the gas mixture to a temperature which is equal or smaller than 150° K. while maintaining a pressure substantially above the vapor pressure corresponding to the temperature reached. The so conditioned gas mixture is then irradiated by laser radiation having a wave length tuned to one absorption line of the molecules containing the isotope to be separated. The radiation excites the molecules, whereby they then may be separated by known chemical and/or physical means from the gas mixture.

The irradiation according to the invention takes place preferably at a relatively high intensity of, for example $10^g$ Watt/$Cm^2$, whereby the excited molecules are dissociated by the irradiation or they are ionized. Thereafter, the molecule fractions containing the isotope to be separated or the ions may be separated by means of known chemical or physical methods from the gas mixture.

According to the invention there is further provided an apparatus for performing the present method. Such apparatus comprises means for generating a supersonic gas flow including a high pressure reservoir for the carrier gas connected to a low pressure reservoir including at least one device for the separation of ionized or dissociated isotopes excited by a laser radiation. The laser used for this purpose is tuned to the absorption line of the isotope to be separated and the laser is arranged so that its radiation extends substantially across the direction of travel of the expanding carrier gas adjacent to the gas exit port of the high pressure reservoir at a position or location where the expanding carrier gas does not yet condensate.

According to a preferred embodiment of the invention, the present apparatus includes means for fanning out the gas stream so that its fanned out flank faces the laser beam. The fanning out of the supersonic gas stream may be accomplished by means of a row of nozzles or by means of a suitably slotted nozzle. The smallest diameter or width of a nozzle opening should be less than 1 mm. Especially where the carrier gas is an inert or noble gas, devices are provided for compressing and recycling the carrier gas from the low pressure reservoir back into the high pressure reservoir.

BRIEF FIGURE DESCRIPTION

In order that the invention may be clearly understood, it will now be described, by way of example, with reference to the accompanying drawings, wherein:

FIG. 1 is a somewhat simplified schematic illustration of an apparatus according to the invention for the separation of isotopes; and FIG. 2 is a block diagram of a laser arrangement wherein the elements illustrated in FIG. 1 are combined in the so called flow chamber.

DETAILED DESCRIPTION OF PREFERRED EXAMPLE EMBODIMENTS

Figure 1:
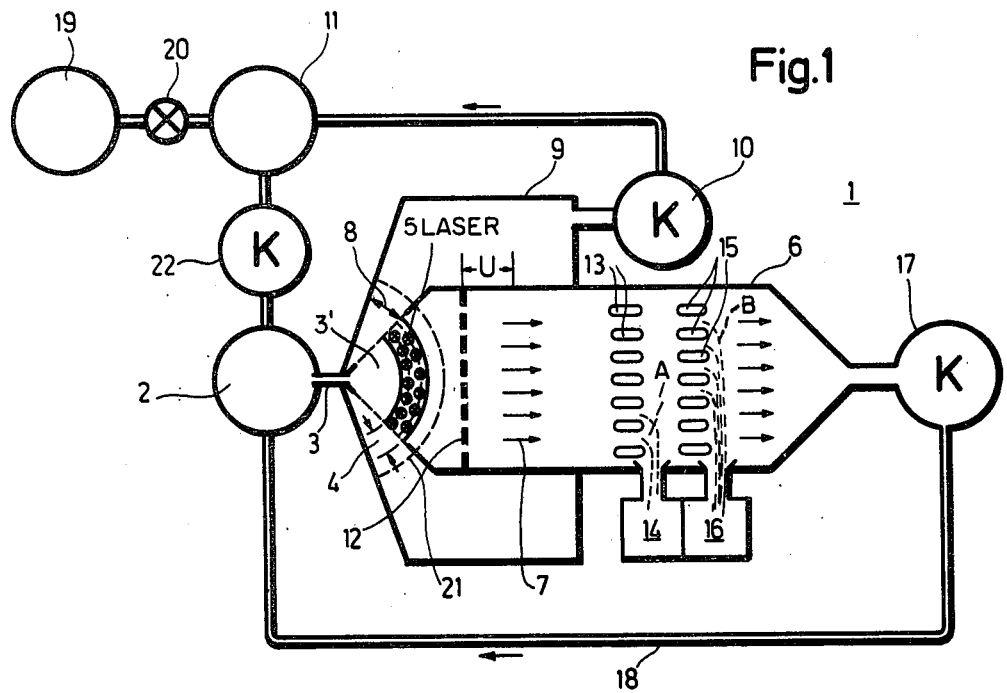

For performing the present invention it is suitable to use a carrier gas which is a gas mixture including the gas with the isotopes to be separated, for example uranium hexafluoride combined with a carrier gas, preferably a noble gas, such as helium. The gas mixture is contained in a high pressure reservoir 2 of the apparatus 1. Jet nozzle means 3 provide an exit for the gas mixture from the high pressure container 2. The jet nozzles and the pressure provide for a supersonic gas exit speed. Fan out means 3' cause the gas to fan into a zone 4 in which the gas has a temperature of less than 150° K. and in which the gas does not yet condensate. The laser beam 5 extends perpendicularly to the plane of FIG. 1 and irradiates the gas in the fanned out zone 4.

The wave length of the laser radiation 5 is tuned to that of the absorption line of the molecules which contain the isotope to be separated, whereby the absorbing molecules are excited, dissociated or ionized. Although it is advantageous that the area 4 of the carrier gas stream through which the laser radiation 5 penetrates is fanned out as shown in FIG. 1, it should be understood, that the fanning out is not absolutely necessary for performing the method according to the invention. Further, the carrier gas may flow in a free jet or it may be formed by one or several nozzles. However, it is essential that the carrier gas is present in the zone or area 4 at a low temperature and at a pressure which is well above the vapor pressure at the respective temperature, whereby the starting temperature and the expansion ratio is selected in such a manner that the gas in the irradiated area or zone 4 has a very high speed preferably Mach 10, while simultaneously reaching a very low temperature of a few degrees K. prior to being decelerated to subsonic speeds, for example, in a diffusor or by means of one or several shock fronts, whereby its pressure is also reduced to that prevailing in the low pressure reservoir 6. By using rather small expansion openings having a diameter of less than 1 mm, preferably of a few micron for example 10 $\mu$m, it is possible to maintain the expansion distance, as well as the expansion time so short that no condensation takes place in the gas mixture as the latter passes from the nozzle exits to the irradiation zone 4, although the gas density is well above the value which would correspond to the respective vapor pressure. In this context, the rotation temperature also attains a value of a few degrees K., which is close to the translation temperature, whereas the population of the vibration levels freezes at temperatures which are between the temperature of the high pressure reservoir 2 and the translation temperature of the hypersonic flow.

As a result of this process only few rotational states are occupied at each vibrational level. Furthermore, the line width of the vibration-rotation transitions are very small due to the low temperature and due to the low pressure. Normally, this line width is determined by the Doppler effect and by the impacts within the gas. Thus, the invention achieves the advantage that the absorption lines of the molecules containing the different isotopes no longer overlap. This may, for example, be the case with regard to $U^{235}F_6$ and $U^{238}F_6$, the absorption lines of which are shifted relative to each other due to the isotropic effect. As a result, only one type of molecule A which contains the isotope to be separated is selectively excited by the irradiation of a laser radiation 5, the wave length of which is tuned to the center of one absorption line. Simultaneously, a chemically equivalent type of molecule B, however, comprising another isotope, remains unchanged. Another advantage of the method according to the invention is seen in that the absorption coefficient is substantially increased in the center of the line due to the small line width, whereby a substantial proportion of the irradiating laser energy is absorbed. Furthermore, the pressure and temperature of the carrier gas in the irradiation zone 4 are selected so that the absorption line is predominantly widened by way of impacts, whereby the widening is homogeneous and the absorption of the laser energy takes place with a high degree of efficiency.

In one type of operation the absorption of the laser energy which is preferably radiated with a high intensity, causes directly a dissociation or ionization of the molecule type A whereby the resulting molecule fractions may be separated in different manners. For example, due to their different aggregation states, their separation may be accomplished by well known freeze out techniques. It is also possible in the alternative to separate the molecules of the A type from the molecules of the B type due to their different chemical reaction capability, whereby chemical methods known as such are used for the separation from the gas mixture. Further, the ions generated from the molecule type A may be separated by means of an electric field.

According to another type of performing the present method, it is possible to merely excite the molecules of the type A by the laser radiation and to cause a dissociation or ionization by the irradiation of a further light source, whereupon the separation itself may be performed as described above. Where two laser radiations are used it is suitable to arrange the respective lasers in such positions that their radiation zones overlap each other in the area 4.

According to a third type of performing the present method a further gas is admixed to the carrier gas mixture, for example $O_2$ or sodium vapor. Preferably, the further gas is of such type that it forms a chemical compound with the molecules of the type A while simultaneously it is not capable of entering into a chemical compound with the nonexcited molecules of the type B. Thus, the chemical compound with the isotopes intended to be separated may be separated by known chemical or physical methods. The carrier gas, which is used for performing the present method is collected in a low pressure reservoir 6, as shown in FIG. 1. The output end of the reservoir 6 is connected to a compressor 17 which in turn is connected through the conduit 18 to the high pressure reservoir 2 for returning the carrier gas into the high pressure reservoir.

The low pressure reservoir 6 comprises a container having an open end connected to the zone 4 to receive the gas flow 7 of the carrier gas. The open end of the low pressure reservoir or container 6 is shaped so as to exclude a boundary layer or proportion 8 of the gas flow which is not suitable for the irradiation by the laser radiation 5. In order to collect the boundary layer flow 8, the open end of the container 6 is surrounded by a further container 9 which collects the boundary flow gas and supplies it to a compressor 10 which is connected by suitable conduits to a storage container 11, which holds the carrier gas.

The container 6 is further provided downstream of the gas flow 7 with means 13, 15 for the separation of the molecule types A and B which have been made distinguishable by the laser radiation. These devices 13, 15 may comprise, for example, cooling coils or the like. Furthermore, an electrode grid 12 is arranged downstream of the irradiation zone 4 and immediately downstream of the shock front 21 of the carrier gas stream. This electrode grid 12 serves for separating the molecules of the type A which permit a separation due the the charge condition or state of their ions. The shock front 21 is formed in the area adjacent to the entrance opening of the low pressure container or reservoir 6. The electrode grid 12 is connected to a suitable voltage U having the required size and direction. The isotope material becoming available at the grid 12 may be removed by mechanical means not shown in detail.

Furthermore, the above mentioned cooling coils 13, 15 are also arranged inside the reservoir 6 in such positions that the carrier gas flows through these cooling coils, whereby a freeze out of the different types of molecules A and B is accomplished. The molecules of the type A are collected in a container 14 whereas the molecules of the type B are collected in a container 16. The molecule type A may, for example, be uranium $U^{238}$, whereas the molecule type B may, for example, be uranium $U^{235}$.

As mentioned above, the carrier gas, which has been freed of the isotopes to be separated, is compressed by the compressor 17 and returned to a conduit 18 into the high pressure container 2. A further storage container 19 is connected through a control valve 20 to the storage container 11. The container 19 holds a gas component to be mixed with the carrier gas held in the supply container 11. The supply container 11 is connected through a compressor 22 to the high pressure container or reservoir 2.

In one example operation for producing isotopes of uranium, the carrier gas comprises 90% by volume of helium and 10% by volume of $UF_6$, whereby the exit temperature $T_o$ at the output of the high pressure container 2 is 500° K. and the pressure is approximately 200 bar. The pressure is reduced to about 0.4 bar downstream of the shock front 21, whereby the speed of the carrier gas flow in the irradiation zone 4 corresponds approximately to Mach 18, while the temperature is 5° K. and the static pressure $P_1$ corresponds to $1 \times 10^{-3}$ bar. The laser radiation 5 may be produced by any conventional lasers, for example, of the CO type having a wave length range between 1690 to 1870 $cm^{-1}$.

Figure 2:
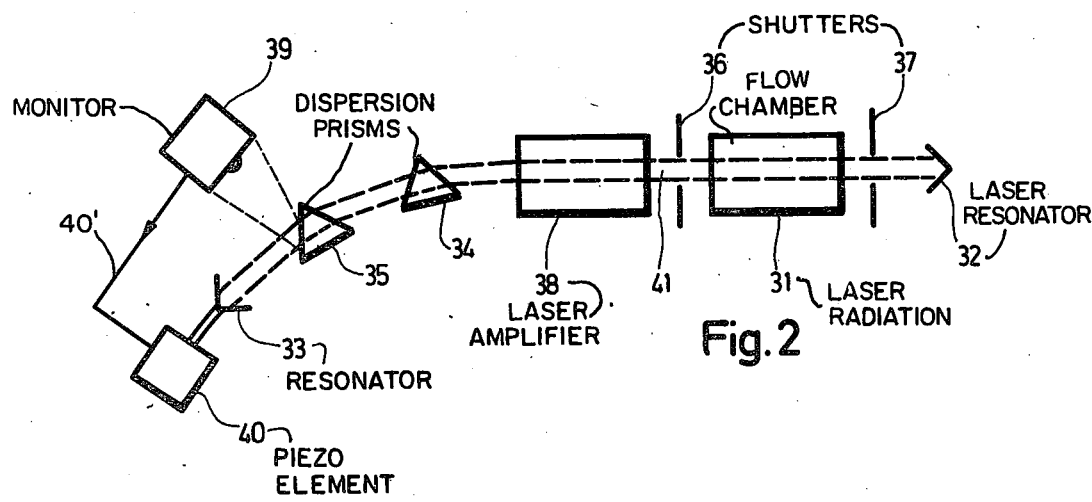

FIG. 2 illustrates s special laser arrangement wherein the low pressure container 6 illustrated in FIG. 1 and its accessories are housed in a flow chamber 31 of the laser itself. The flow direction of the carrier gas is perpendicular to the plane of the drawing. The laser may, for example, be provided in a known manner with resonators 32 and 33 shown, for example, in FIG. 2. Two prisms 34 and 35 act as dispersion elements. A laser amplifier 38 is arranged between the prism 34 and a shutter 36 downstream of the laser flow direction. The flow chamber or irradiation chamber 31 is arranged downstream of the shutter 36. A further shutter 37 is located downstream of the chamber 31. A monitor 39 receives a deflected portion of the laser energy from the prism 35 and provides a feedback control 40' to the piezoelement 40. The monitor 39 measures the laser power output to control the element 40. The position of the laser resonator 33 is controlled in such a manner that the laser position corresponds to a predetermined power output, said laser output corresponding to a laser frequency which coincides with the center of the absorption line of the type of molecule to be irradiated. The shutters 36 and 37 are provided with apertures which are dimensioned to obtain an efficient cross section for the laser radiation 41 relative to the particular type of carrier gas to be irradiated. It is advantageous to employ ring resonators of the travelling wave type for the laser, because these exhibit a homogeneous intensity distribution along the axis of the resonator.

In the light of the foregoing disclosure, it will be appreciated that according to the invention it is possible to arrange several lasers in sequence or in a row along the direction of the carrier gas stream, whereby all lasers may be tuned to the same frequency or individual lasers may be tuned to different frequencies relative to adjacent lasers. For special purposes, the lasers may be arranged to provide overlapping irradiation areas in the zone 4, which is free of condensation. The monitor 39 which controls the laser frequency as described above, to assure a stable operational state over prolonged periods of time, will then also be duplicated to control the frequency of each laser individually.

Further, according to the invention, the low pressure container or reservoir 6 may be constructed to form the resonator chamber of the laser, whereby, as mentioned, a ring resonator in which the laser radiation circulates as a travelling wave, has been found satisfactory. In any of the just described modifications of the invention, the resonator space which also forms the low pressure container 6 may include a high voltage electrode 12 and/or cooling means as described.

It should be mentioned that the container 19 with its control valve 20 has the advantage that the combination of components in the carrier gas may be adjusted to achieve a carrier gas composition providing the most advantageous or most efficient operating conditions. Preferably, the container 19 with its valve 20 is connected to the high pressure side of the system. Incidentally, where uranium isotopes are to be produced, it is suggested that all components of the system coming into contact with the carrier gas should be made of material which is durable against any attacks by fluorine.

With regard to the above example describing the production of uranium isotopes from a carrier gas of helium with a proportion of uranium hexafluoride, it will be appreciated that the gas mixture is irradiated at a temperature less than 150° K., whereby the wave length of the laser radiation corresponds to an absorption line of the molecule containing the isotope to be separated. As described, the carrier gas is returned into the process, preferably in repeated cycles. The carrier gas flows with supersonic speeds out of the container 2 and in order to achieve such speeds, pressures exceeding 100 bar will be employed. In the above example, the pressure was 200 bar, whereby the gas composition, the gas pressure and the surface area ratio of the expanding flow is selected in such a manner that the irradiated absorption line is homogeneously widened in the irradiation zone 4 and the laser radiation direction extends substantially across the flow direction of the carrier gas.

Further, with regard to the above example of performing the present method, the vibration rotation line 5 of $U^{235}F_6$ or $U^{238}F_6$ irradiated with a CO laser tuned to the wave length of this line, which is made up of the respective combination bands, for example, $3\nu_3-$, $\nu_1+\nu_2+\nu_3-$ or $2\nu_2+\nu_3-$ bands. The temperature of the $UF_6$ component in the carrier gas is approximately 5° K. in the irradiation zone 4.

Although the invention has been described with reference to specific example embodiments, it is to be understood, that it is intended to cover all modifications and equivalents within the scope of the appended claims.

What is claimed is:

1. A method for separating isotopes from a gas mixture, including a carrier gas and molecules containing said isotopes, comprising the step of using a laser radiation having an intensity sufficient for ionizing said molecules, accelerating said gas mixture to supersonic speeds to impart to the gas mixture a temperature below 150° K., simultaneously subjecting the gas mixture to a pressure above the vapor pressure at said temperature of the gas mixture below 150° K., irradiating said accelerated gas mixture with said laser radiation having a wave length corresponding to the absorption line of the molecules including said isotope to excite and ionize said molecules by said laser radiation, and physically or chemically removing the isotope from the excited molecules of the gas mixture by separating said ions by means of a field, such as an electric field.

2. The method of claim 1, wherein said laser radiation has an intensity sufficient for dissociating or ionizing said molecules whereupon the resulting molecule fractures are subjected to said removing step.

3. The method of claim 1, comprising subjecting said gas mixture repeatedly to a laser radiation.

4. The method of claim 1, comprising producing molecule fractures with the aid of said laser radiation, and subjecting said molecule fractures to a freeze out to accomplish said removing.

5. The method of claim 1, comprising using as said carrier gas a noble or inert gas, and returning said carrier gas into the process for reuse after the separation.

6. The method of claim 1, comprising subjecting said carrier gas to a pressure above 100 bar for producing a supersonic flow, adjusting the gas composition, said gas pressure, and the ratio of the gas exit nozzle surface to the surface area of the expanding gas flow in such a manner that the irradiated absorption line in the irradiation zone is homogeneously broadened, and directing said laser radiation perpendicularly relative to the gas flow direction.

7. The method of claim 1, comprising admixing to a carrier gas, such as helium, uranium hexafluoride ($UF_6$) which is introduced into said carrier gas at a pressure of about 10 bar and at a respective temperature of about 500° K., and irradiating by means of a CO-laser, a vibration rotation line of $U^{235}F_6$ or $U^{238}F_6$ of the combination bands $3\nu_3$, $\nu_1+\nu_2+\nu_3$ or $2\nu_2+\nu_3$, wherein said CO-laser is tuned to the center of the absorption line and the temperature of said uranium hexafluoride ($UF_6$) is less than 150° K. in the irradiation zone.

8. An apparatus for separating isotopes from a gas mixture including a carrier gas and molecules containing said isotopes, comprising high pressure container means, low pressure chamber means including a gas expansion and irradiation zone, separation means operatively located in said low pressure chamber means, nozzle means operatively interconnecting said high pressure container means and said gas expansion and irradiation zone to produce a supersonic gas flow from said high pressure container means into said gas expansion and irradiation zone wherein said gas flow expands, laser radiation means tuned in its frequency to an absorption line of said isotope and operatively arranged relative to said gas expansion and irradiation zone for irradiating said expanding gas flow substantially at a right angle relative to the gas flow direction, said laser radiation means being further located adjacent to said nozzle means so as to cause the irradiation in said zone at a location free of condensation, and wherein said nozzle means have a configuration such that said gas flow fans out into said gas expansion and irradiation zone to present a homogeneous flank to the laser radiation means.

9. The apparatus of claim 8, wherein said nozzle means comprise nozzle opening means the smallest size of which is less than 1 mm.

10. The apparatus of claim 8, further comprising compressor means having intake means operatively connected to said low pressure chamber means and discharge means operatively connected to said high pressure container means for returning said carrier gas to said high pressure container means.

11. The apparatus of claim 8, wherein said laser radiation means comprise a plurality of lasers arranged in series in the gas flow direction, said lasers being tuned to the same frequency or to different frequencies.

12. The apparatus of claim 8, further comprising laser energy sensing means, laser frequency tuning means operatively connected to said laser radiation means and responsive to said laser energy sensing means for tuning the laser frequency.

13. The apparatus of claim 8, wherein said low pressure chamber means is constructed to form a laser resonator chamber.

14. The apparatus of claim 13, wherein said laser resonator chamber forms a travelling wave ring resonator.

15. The apparatus of claim 8, further comprising gas supply means operatively connected to said high pressure container means for supplying in a controlled manner an additional gas component at high pressure into said high pressure container means.

16. The apparatus of claim 8, wherein all apparatus components in contact with said carrier gas are made of fluoride resistant materials.

* * * * *